Figure 1:
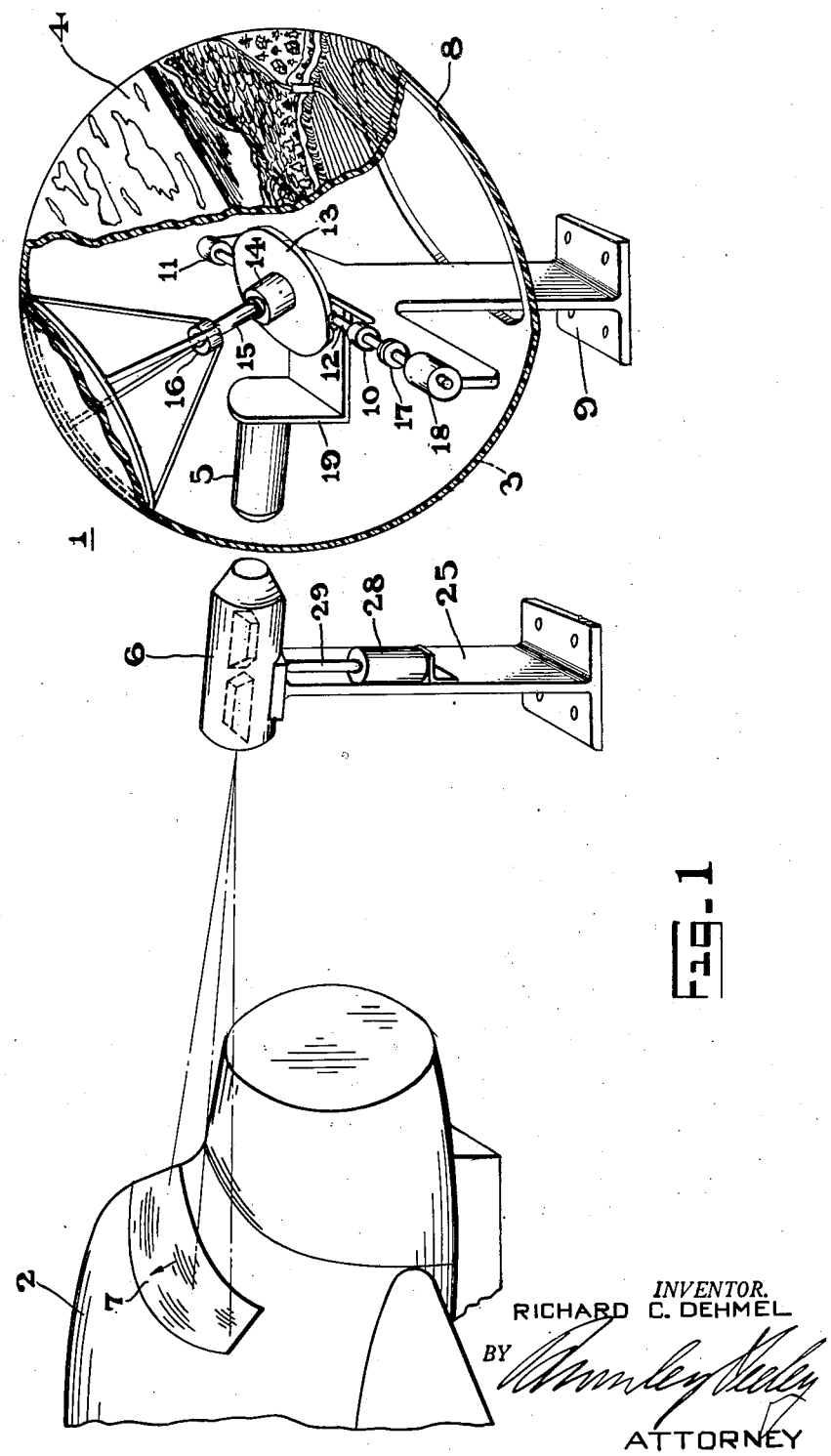

June 21, 1949. R. C. DEHMEL 2,474,096
OPTICAL TRAINING APPARATUS
Filed April 17, 1945 2 Sheets-Sheet 1

INVENTOR.
RICHARD C. DEHMEL
BY
ATTORNEY

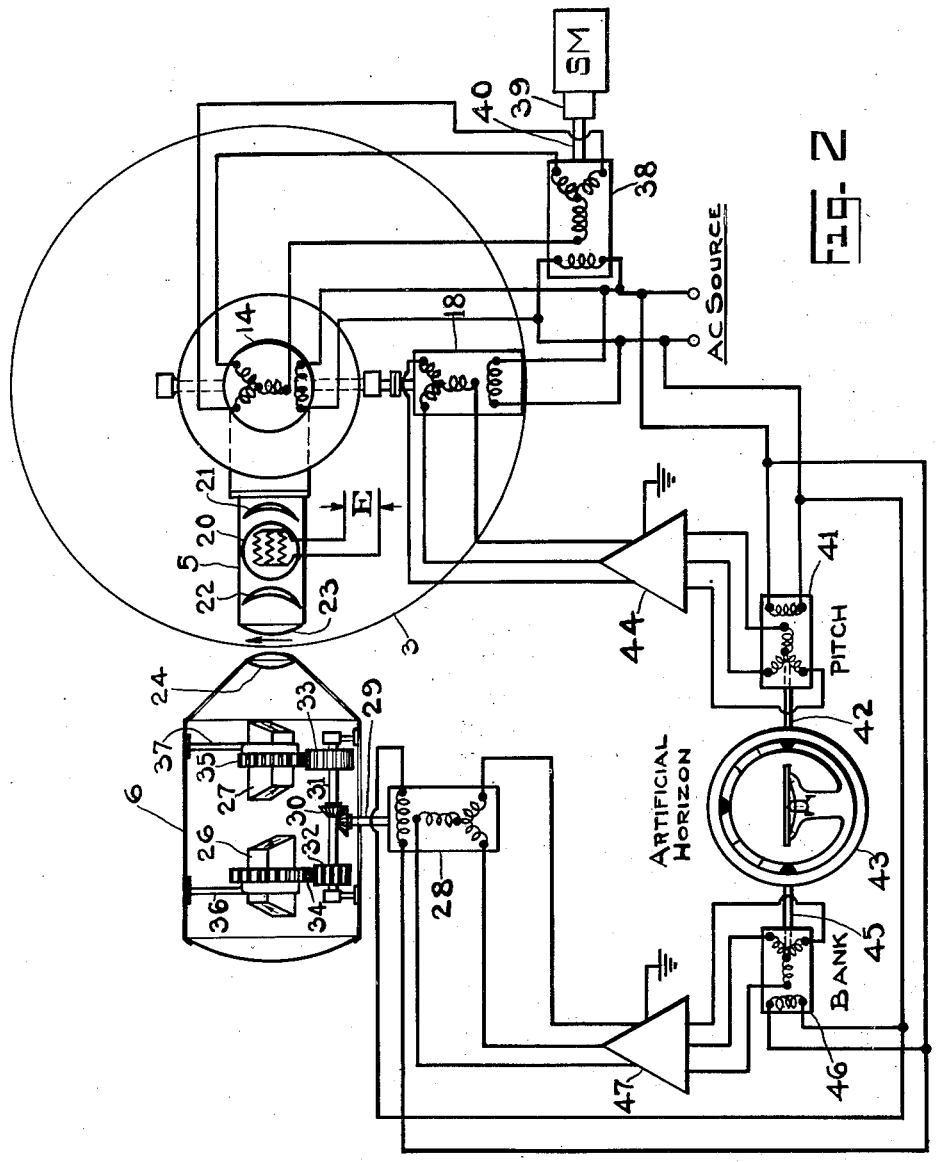

Patented June 21, 1949

2,474,096

UNITED STATES PATENT OFFICE 2,474,096

OPTICAL TRAINING APPARATUS

Richard C. Dehmel, Summit, N. J.

Application April 17, 1945, Serial No. 588,788

4 Claims. (Cl. 35—12)

My invention relates to apparatus for the ground training of aircraft pilots, and particularly ground trainers of the type in which the optical effect of actual flight is produced on the pilot using the device.

An object of this invention is to provide an improved ground training apparatus constructed and arranged to simulate the optical effect of actual flight on a student pilot as it would appear to him during actual flight maneuvers.

A further object is to provide an improved apparatus in a ground trainer adapted, during simulated maneuvers such as dives, rolls, and level flying, to picture to the pilot the relative position of the aircraft and earth as it would appear under corresponding conditions of actual flight.

The invention will be more fully set forth in the following description referring to the accompanying drawings, and the features of novelty which characterize my invention will be pointed out with particularity in the claim annexed to and forming a part of this specification.

Referring to the drawings,

Fig. 1 is a perspective view, partly exposed, of a ground training apparatus constructed in accordance with an embodiment of the present invention; and Fig. 2 is a diagrammatic view illustrating the preferred arrangement of the operating parts employed in the training apparatus shown in Fig. 1.

In accordance with my invention a landscape or terrestial image is projected on a screen, such as the windshield of a trainer and in accordance with the manipulation of coordinatable simulated aircraft controls this image is caused to rise, fall, rotate, bank or turn in precisely the same manner as the earth would appear to be moving to an occupant of an actual aircraft piloted through similar maneuvers. The coordinatable simulated controls, such as the stick, rudder, throttle, etc., are disposed in the trainer cockpit and need not be illustrated since a detailed description is unnecessary for a complete understanding of the present invention. For example, these controls and the associated control equipment may be of the type disclosed in my Patent 2,366,603, granted January 2, 1945, for "Aircraft training apparatus," wherein there is shown means for energizing a steering motor in response to manipulation of the controls for turning or banking, and for operating simulated flying instruments, such as a bank indicator, artificial horizon, etc., in response to corresponding manipulation of the controls.

There is shown in Fig. 1 an aircraft trainer comprising optical apparatus generally indicated at 1 and a grounded cockpit or cabin 2 for the student pilot. The optical apparatus includes a movable transparent film or diapositive 3 shown for the purposes of illustration as in the form of a terrestial globe presenting a panorama 4. A light source 5 and a projection mechanism 6 are employed for projecting on a translucent screen, such, for example, as the windshield 7 of the trainer a portion of the panorama 4.

Preferably, the element constituting the diapositive 3 is substantially in the shape of a sphere so that it can present a continuous panorama and is arranged to be rotated about two separate axes perpendicular to each other. To this end the spherical element 3, which has an opening 8 at its lower side is mounted on a suitable stationary support or pedestal 9. This support provides trunnion bearing 10 and 11 for a generally horizontally disposed shaft 12 that carries a mounting 13 for a servo-motor or the like 14. This motor is connected to the spherical element at its top by means of a spider structure 16 and is positioned so that its operating shaft 15 is normally in a generally vertical position, i. e. perpendicular to the plane of the mounting 13. The shaft 12 is operatively connected through a coupling 17 to a second servo-motor 18. Accordingly, operation of the motor 14 is effective to rotate the diapositive in azimuth to represent turn, and operation of the motor 18 is effective to pitch the diapositive in a vertical direction.

The light source 5 is disposed adjacent to and at the inner side of the diapositive and is attached to a bracket 19 secured to the support 9 and comprises a high-powered lamp 20, Fig. 2, of suitable candle power, a reflector 21 and light focusing lenses 22 and 23. The purpose of the illuminating unit is to light brilliantly a portion of the diapositive for projecting an image, such as indicated by the arrow, on the objective lens 24 of the projection apparatus 6 that is disposed at the outer side of the diapositive opposite to the light source 5.

The projection apparatus 6 is mounted on a fixed pedestal 25, Fig. 1, and comprises a cylindrical housing within which projecting means such as a pair of Dove prisms 26 and 27 are positioned. The function of the projection unit 6 is to scan the spherical surface at 3 and cast an image on the windshield 7 of the trainer cabin 2, or other screen. The windshield 7 is preferably composed of a translucent material so that any image formed by the projection unit 6 can be seen by an observor or student operating the controls inside the trainer 2. It should be understood that the screen need not be translucent and that the image can be projected from the rear of the student on to a screen in front of him. The operation of the projection unit 6 is similar to that of the optical projector disclosed in my co-pending application S. N. 498,906, filed August 14, 1943, for "Aircraft navigating and training apparatus."

The Dove prisms are employed to rotate the image represented by the arrow at the diapositive in accordance with simulated rotation or "roll" of the aircraft, and thereby cause the projected image to rotate on the screen 7. To this end, the prisms which are suitably aligned along their projection axes are arranged to be rotated by a servo-motor 28 that is operated in accordance with the simulated roll of the trainer.

The shaft 29 of the motor is connected through gearing 30, Fig. 2, to a countershaft 31 having secured thereto driving gears 32 and 33 which operate the ring gears 34 and 35 secured to the prisms 26 and 27 respectively. The ring gears surrounding the prisms are provided with off-set collars (not shown) forming in effect stub shafts for the annular supporting bearings 36 and 37. The prisms 26 and 27 rotate in like directions, but the prism 26 rotates at one-half of the speed of prism 27. This correction factor is due to the fact that in this type prism the projected image is rotated at twice the speed of the prism itself.

It will now be apparent that if the surface of the transparent sphere at 3 is coated with a black and white, or color image of any landscape or terrestial scene which may include the horizon, sky and earth, an image may be cast on the windshield or other screen and caused to move in such manner as to depict the combined effects of turning, climbing, diving or rolling of an aircraft. The image is caused to rotate in azimuth by the servo-motor 14, Fig. 2, which is shown for example as a Selsyn unit energized from the corresponding driving unit 38. The unit 38 is positioned in accordance with operation of the steering motor SM through suitable reduction gearing 39 and operating shaft 40. The steering motor can be suitably energized in response to operation of the coordinatable controls in the manner above referred to and described in my aforesaid patent.

The effect of pitch is obtained by energizing the servo-motor or Selsyn unit 18 by a corresponding driving unit 41 that is suitably positioned in response to rotation of the pitch element 42 of the artificial horizon device 43 responsive to manipulation of the trainer by the student pilot. Since the torque available at the shaft 42 is quite small, the Selysn unit 41 is of corresponding capacity and the positioning current is therefore amplified as indicated at 44 for proper energization of the unit 18. The operating elements of the artificial horizon indicator 43 are disclosed in detail in my patent above identified and therefore need not be illustrated. It should be understood however that my invention is not limited to this specific type of artificial horizon device and that any suitable apparatus having elements responsive to change in pitch and change in the position of bank or roll can be used in practicing my invention.

The effects of roll are obtained by energizing the servo-motor or Selsyn unit 28 in accordance with the position of the artificial horizon element 45 that is responsive to the condition of bank or roll. The rotatable element 45 positions the corresponding Selsyn unit 46 in accordance with the degree of bank, and as in the case of the pitch element, the driving current is suitably amplified at 47 for properly energizing the unit 28. The torque amplifiers at 44 and 47 may be of any well known type and detailed description thereof is unnecessary for the purposes of this invention.

It is to be understood that the azimuthal and pitch rotation of the spherical diapositive need not be produced by Selsyn units, but may be caused by any convenient means, such as belt and pulley apparatus, or a servo mechanism. Also, it is not necessary that the motion which introduces the roll effect be obtained by the prisms of the projection device 6. This motion may alternatively be provided by means of an additional gimbal ring at the suspension of the spherical element which may be tilted according to the angle of roll. In that event, a simple projection lens system is employed at 24 to form an image of a portion of a scenic effect such as indicated by the arrow.

The picture on the surface of the spherical unit may be formed by coating such surface with a photographic emulsion and exposing the sphere progressively through a slit lens to form a continuance image, such as seen by an observer viewing the sky and ground in all directions around him.

In electrical trainers where the azimuth angle, the pitch, and the roll angle do not appear as shaft movements, but instead as electrical potentials, the shafts 12 and 15 supporting the diapositive unit may be rotated by electric servo follow-up units, and the shaft 29 for simulating roll may likewise be rotated by servo drive.

It should be understood that this invention is not limited to specific details of construction and arrangement thereof herein illustrated, and that changes and modifications may occur to one skilled in the art without departing from the spirit of the invention.

I claim:

1. Aircraft training apparatus comprising a diapositive generally spherical in shape presenting a panorama, means for moving said diapositive in azimuth in response to steering control, means for moving said diapositive in a direction to simulate pitch in response to altitude control, a source of illumination at one side of said diapositive, projection apparatus at the other side thereof opposite said source, means for operating said projection apparatus to simulate roll, and a screen upon which a portion of said panorama is projected.

2. Aircraft training apparatus comprising an element having a spherical surface presenting a terrestial scene, means for moving said element in a direction representing pitch, means for moving said element in a direction representing turn, a source of illumination adjacent to said element, projection apparatus associated therewith, means for operating said projection apparatus independently of said terrestial scene element to represent roll, and a screen upon which a portion of said scene is projected.

3. Aircraft training apparatus for student pilots comprising a diapositive presenting a substantially continuous panorama, means for moving said diapositive in azimuth and in pitch direction in accordance with simulated maneuvers by the pilot, a source of illumination located at one side of said diapositive, projection means at the other side thereof opposite said source, means for rotating said projection means about the projection axis thereof to represent roll, a grounded cockpit for the student, and a screen forming a part of said cockpit upon which a portion of said panorama is projected.

4. Aircraft training apparatus for student pilots comprising a diapositive generally spherical in shape presenting a panorama, means for rotating said diapositive about a generally horizontal axis to represent pitch, means for rotating said diapositive about a generally vertical axis to represent turn, a source of illumination at the inner side of said diapositive, projection prism structure at the outer side of said diapositive opposite said source, means for rotating said prism structure about the projection axis thereof to represent roll, a grounded cockpit for the student and a translucent screen upon which a portion of said panorama is projected substantially forming the windshield of said cockpit.

RICHARD C. DEHMEL.

REFERENCES CITED

The following references are of record in the file of this patent:

UNITED STATES PATENTS

| Number | Name | Date |
| --- | --- | --- |
| 988,471 | Jones | Apr. 4, 1911 |
| 1,419,598 | Zelazo | June 13, 1922 |
| 1,631,866 | Heuring | June 7, 1927 |
| 1,874,279 | Geromanos | Aug. 30, 1932 |
| 2,085,050 | Stout | June 29, 1937 |
| 2,271,296 | Hargrave | Jan. 27, 1942 |
| 2,289,877 | Dreyer | July 14, 1942 |
| 2,307,840 | Mac Donald | Jan. 12, 1943 |
| 2,336,436 | Beindorf | Dec. 7, 1943 |
| 2,352,101 | Hutter | June 20, 1944 |
| 2,369,418 | St. John | Feb. 13, 1945 |